US012738661B2

(12) United States Patent
Lin et al.

(10) Patent No.: US 12,738,661 B2
(45) Date of Patent: Sep. 15, 2026

(54) ANTENNA DEVICE

(71) Applicants: INVENTEC (PUDONG) TECHNOLOGY CORPORATION, Shanghai (CN); INVENTEC CORPORATION, Taipei City (TW)

(72) Inventors: Hsin-Hung Lin, Taipei City (TW); Yu Shu Tai, Taipei City (TW); Wei-Chen Cheng, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 39 days.

(21) Appl. No.: 18/981,140

(22) Filed: Dec. 13, 2024

(65) Prior Publication Data

US 2025/0385436 A1 Dec. 18, 2025

(30) Foreign Application Priority Data

Jun. 13, 2024 (CN) ......................... 202410764963.2

(51) Int. Cl.

| | |
|---|---|
| ***H01Q 13/20*** | (2006.01) |
| ***H01Q 1/22*** | (2006.01) |
| ***H01Q 1/42*** | (2006.01) |

(52) U.S. Cl.
CPC ......... *H01Q 13/206* (2013.01); *H01Q 1/2283* (2013.01); *H01Q 1/422* (2013.01)

(58) Field of Classification Search
CPC ..... H01Q 13/206; H01Q 1/2283; H01Q 1/422
See application file for complete search history.

(56) References Cited

U.S. PATENT DOCUMENTS

| | | | | |
|---|---|---|---|---|
| 2007/0176827 A1* | 8/2007 | Itoh | H01Q 13/206 343/700 MS |
| 2019/0089057 A1* | 3/2019 | Mitchell | H01Q 5/42 |
| 2020/0127387 A1* | 4/2020 | Park | H01Q 9/30 |
| 2020/0335873 A1* | 10/2020 | Achour | H01Q 5/371 |
| 2021/0151899 A1* | 5/2021 | Park | H01Q 5/385 |

* cited by examiner

*Primary Examiner* — Hai V Tran
(74) *Attorney, Agent, or Firm* — Maschoff Brennan

(57) ABSTRACT

An antenna device includes a first substrate, a second substrate, a low frequency exciting assembly and a high frequency exciter. The first substrate has a first top surface and a first bottom surface located opposite to each other. The second substrate is stacked on the first substrate, and has a second top surface and a second bottom surface located opposite to each other. The second bottom surface is connected to the first top surface. The low frequency exciting assembly is disposed on the first top surface. The high frequency exciter is disposed on the second top surface. A projection of the high frequency exciter orthogonally projected onto the first substrate does not overlap with the low frequency exciting assembly.

7 Claims, 11 Drawing Sheets

ANTENNA DEVICE

CROSS-REFERENCE TO RELATED APPLICATIONS

This non-provisional application claims priority under 35 U.S.C. § 119(a) on Patent Application No(s). 202410764963.2 filed in China, on Jun. 13, 2024, the entire contents of which are hereby incorporated by reference.

BACKGROUND OF THE INVENTION

Technical Field of the Invention

The invention relates to an antenna device, more particularly to an antenna device including low frequency exciters and a high frequency exciter.

Description of the Related Art

With the advancement of wireless communication technology, electronic devices such as mobile phones and personal digital assistants are evolving towards more diversified functions, becoming lighter and thinner, and achieving faster and more efficient data transmission. In particular, wireless communication technology is expected to enter the 6G era by 2030, meeting various life applications and business requirements that 5G has not fulfilled.

In the 6G era, the frequency band of the K-band of the millimeter wave covers an important frequency band ranging about from 18 GHz to 26.5 GHz. A wider frequency band and a higher data transmission rate can be provided in this frequency band. However, the return losses of the conventional antenna devices are still too high to meet communication requirements of 6G. Therefore, improving the communication quality of the antenna device in the frequency band of 6G technology is one of the key issues that researchers need to address.

SUMMARY OF THE INVENTION

The invention provides an antenna device for improving the communication quality of the antenna device in the frequency band of 6G technology.

One embodiment of the invention provides an antenna device including a first substrate, a second substrate, at least one low frequency exciting assembly and at least one high frequency exciter. The first substrate has a first top surface and a first bottom surface located opposite to each other. The second substrate is stacked on the first substrate, and has a second top surface and a second bottom surface located opposite to each other. The second bottom surface is connected to the first top surface. The at least one low frequency exciting assembly is disposed on the first top surface, and includes two first low frequency exciters, two second low frequency exciters and a third low frequency exciter. The two first low frequency exciters and the two second low frequency exciters are arranged along two parallel lines, respectively. At least a part of the third low frequency exciter is disposed between the two first low frequency exciters and the two second low frequency exciters. The at least one high frequency exciter is disposed on the second top surface. A projection of the at least one high frequency exciter orthogonally projected onto the first substrate does not overlap with the at least one low frequency exciting assembly.

According to the antenna device disclosed by the above embodiments, the low frequency exciting assembly and the high frequency exciter are disposed on the first substrate and the second substrate, respectively, and the low frequency exciting assembly 14 and the high frequency exciter 15 can generate low frequency signals and high frequency signals, respectively. Therefore, the antenna device can generate a wider frequency band to cover the frequency band of the K-band of the millimeter wave, and the return loss of this frequency band can be reduced so as to meet communication requirements of 6G. Accordingly, the communication quality of the antenna device in the frequency band of 6G technology can be improved.

Furthermore, the first low frequency exciters and the second low frequency exciters are arranged along two parallel lines, respectively. At least a part of the third low frequency exciter is disposed between the first low frequency exciters and the second low frequency exciters. The projection of the high frequency exciter orthogonally projected onto the first substrate does not overlap with the low frequency exciting assembly. Therefore, the frequency band generated by the antenna device can cover the frequency band of the K-band of the millimeter wave via the aforementioned arrangement.

BRIEF DESCRIPTION OF THE DRAWINGS

The invention will become more fully understood from the detailed description given herein below and the accompanying drawings which are given by way of illustration only and thus are not limitative of the invention and wherein.

DETAILED DESCRIPTION

Figure 1:
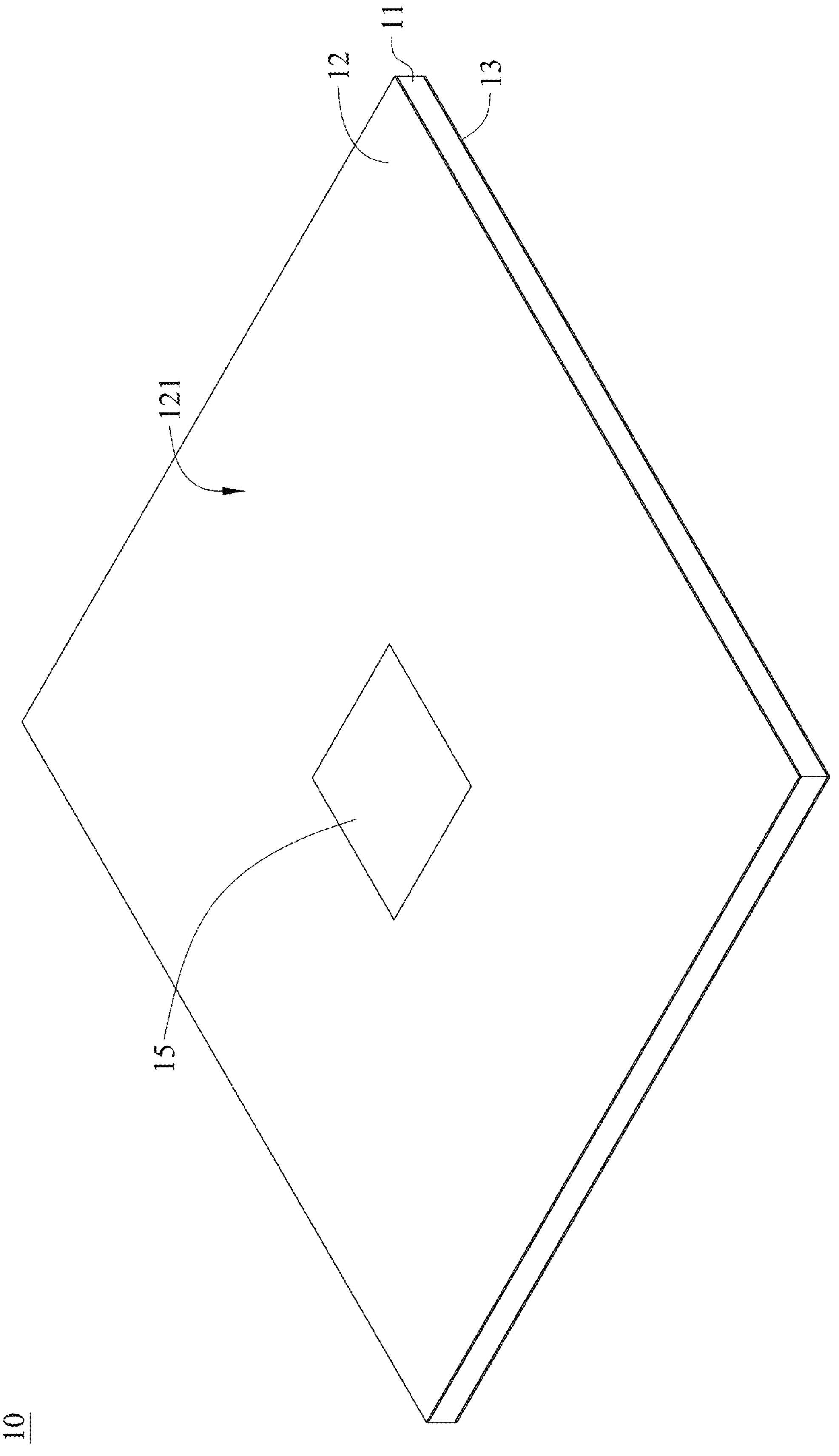
FIG. 1 is a perspective view of an antenna device in accordance with first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the invention, such as technical and scientific terms, have its own meanings and can be comprehended by those skilled in the art, unless the terms are additionally defined in the invention. That is, the terms used in the following paragraphs should be read on the meaning commonly used in the related fields and will not be overly explained, unless the terms have a specific meaning in the invention.

Figure 2:
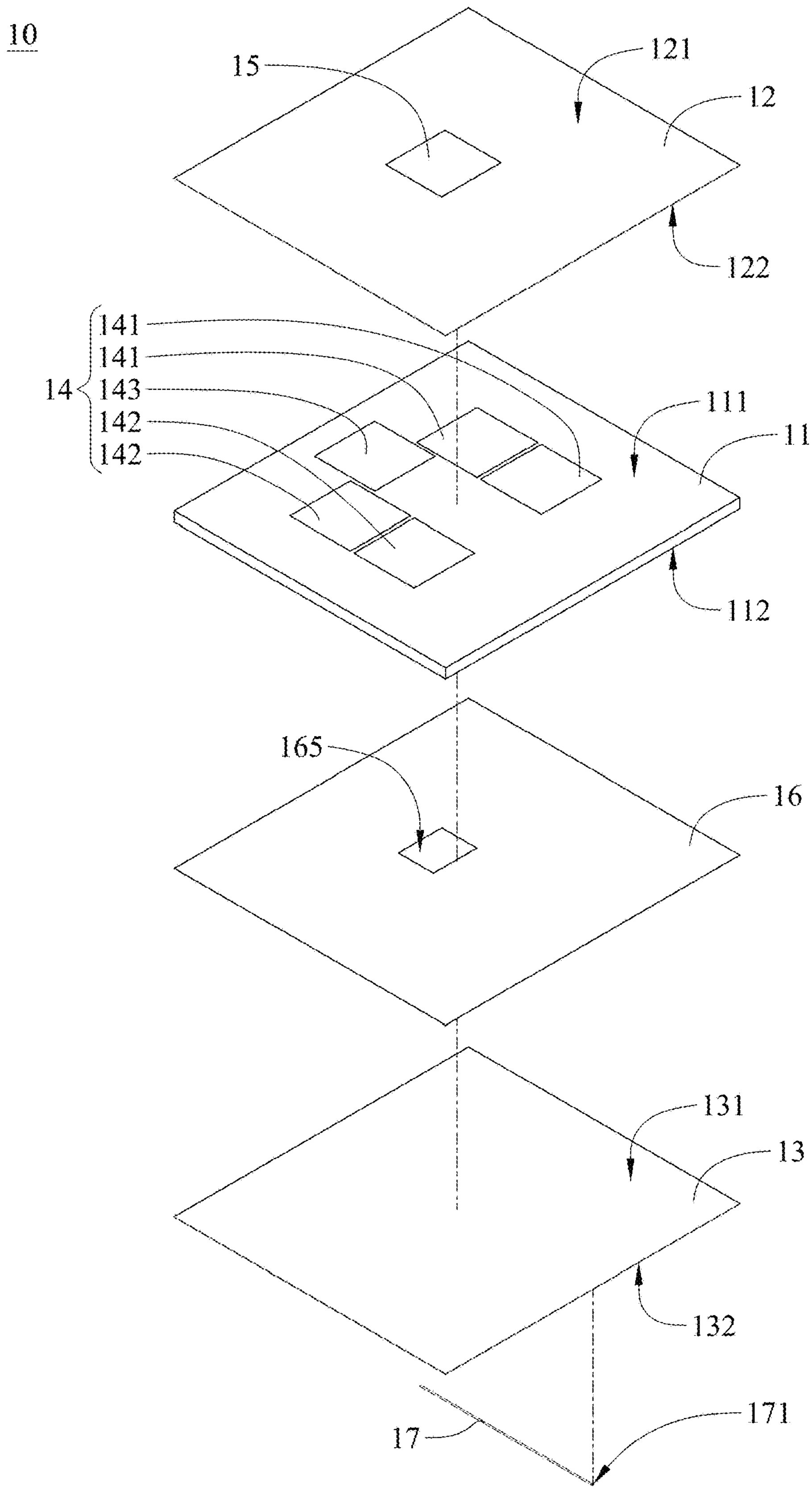
FIG. 2 is an exploded view of the antenna device in FIG. 1.
Figure 3:
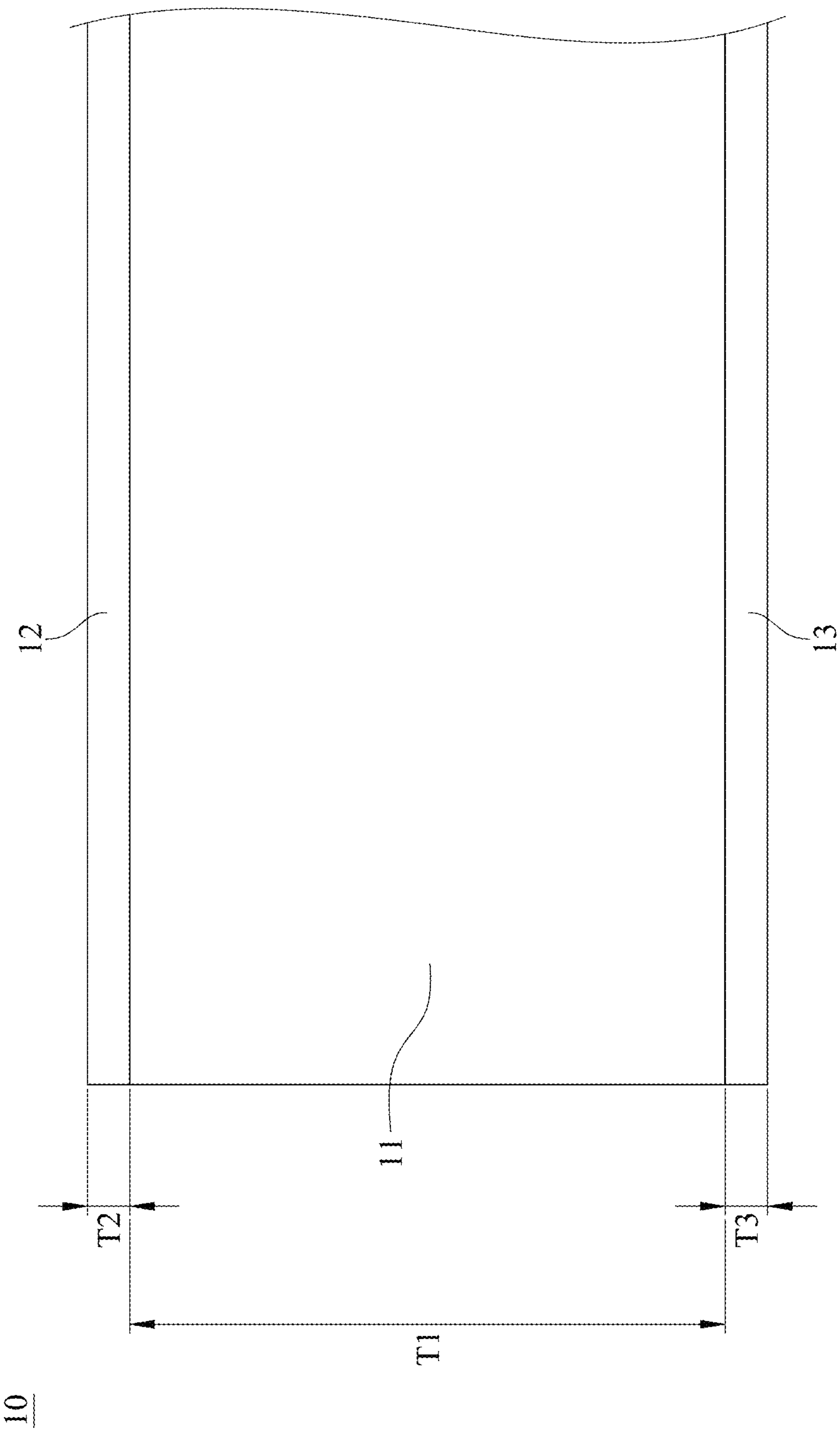
FIG. 3 is a partially enlarged side view of the antenna device in FIG. 1.

Please refer to FIG. 1 to FIG. 3, where FIG. 1 is a perspective view of an antenna device 10 in accordance with first embodiment of the invention, FIG. 2 is an exploded view of the antenna device 10 in FIG. 1, and FIG. 3 is a partially enlarged side view of the antenna device 10 in FIG. 1.

In this embodiment, the antenna device 10 includes a first substrate 11, a second substrate 12, a third substrate 13, a low frequency exciting assembly 14, a high frequency exciter 15, a coupling body 16 and a transmission line 17. The second substrate 12 and the third substrate 13 are made of, for example, a same materials. The first substrate 11 and the second substrate 12 are made of, for example, different materials. For example, the first substrate 11 is made of RO4350 material. The second substrate 12 and the third substrate 13 are made of GHPL-970 materials. Therefore, the first substrate 11 and the second substrate 12 have different dielectrics. Accordingly, an overall thickness of the first substrate 11, the second substrate 12 and the third substrate 13 can be reduced via different materials of the substrates.

Figure 4:
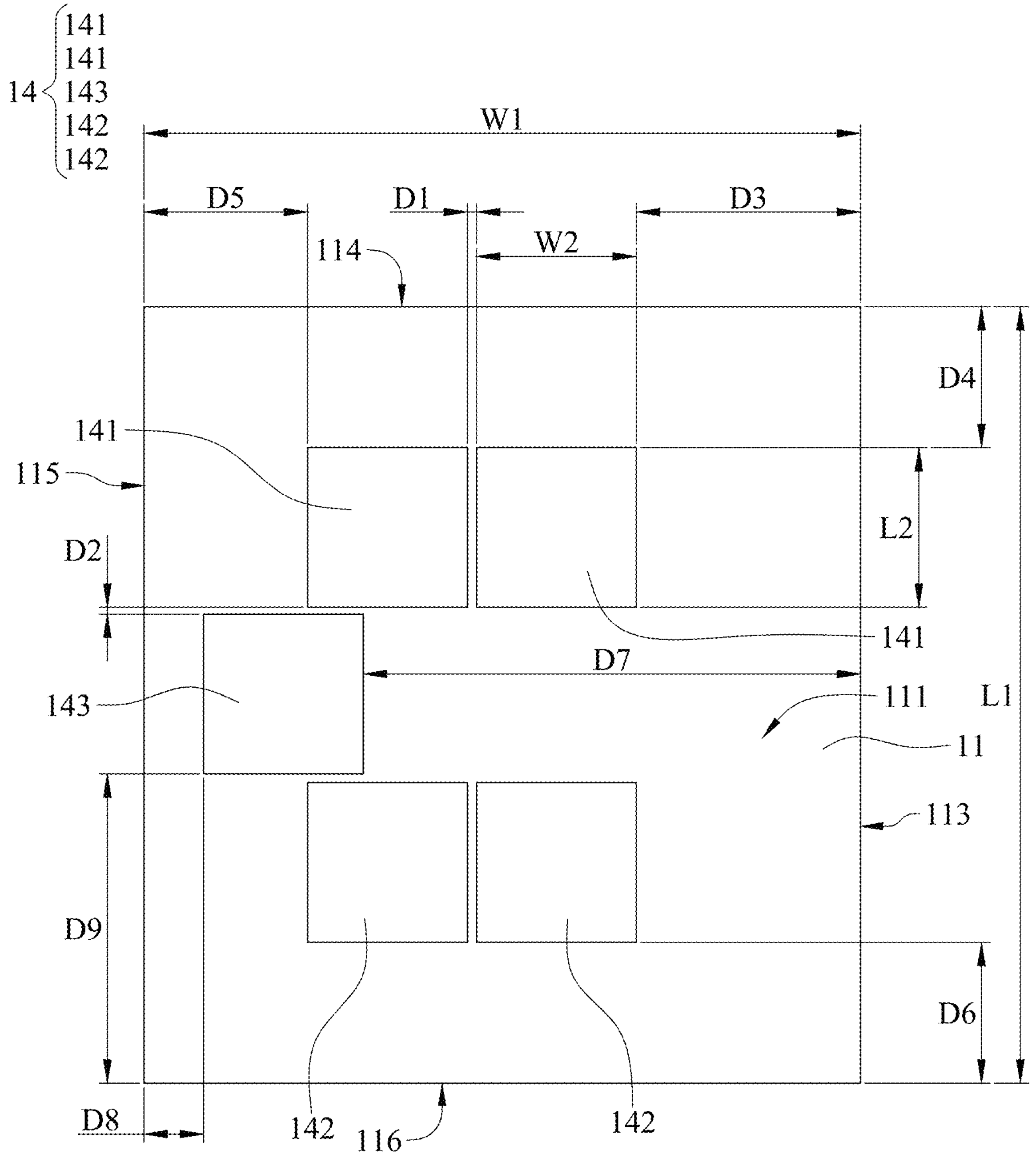
FIG. 4 is a top view of a first substrate and a low frequency exciting assembly of the antenna device in FIG. 1.
Figure 5:
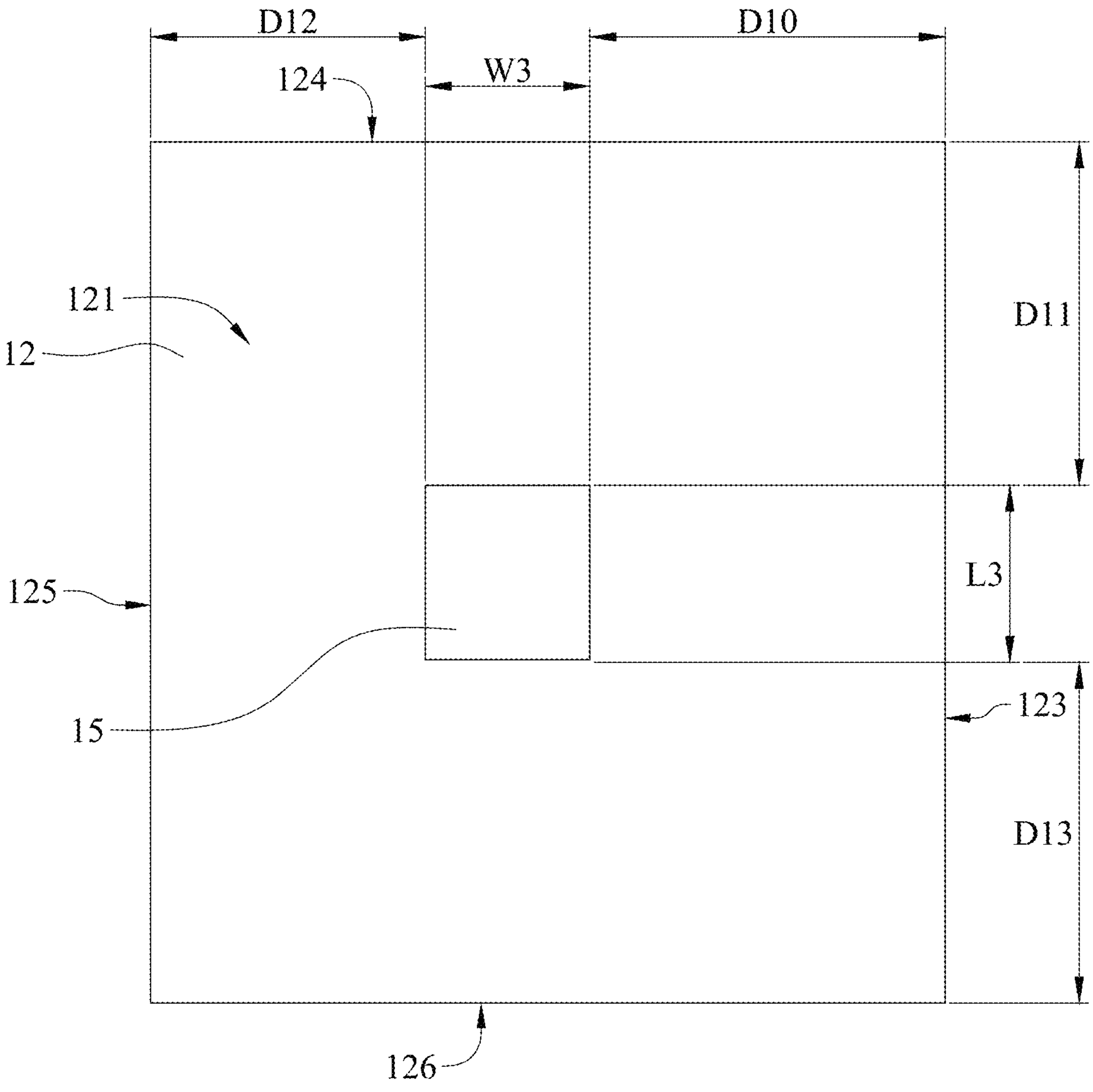
FIG. 5 is a top view of a second substrate and a high frequency exciter of the antenna device in FIG. 1.
Figure 6:
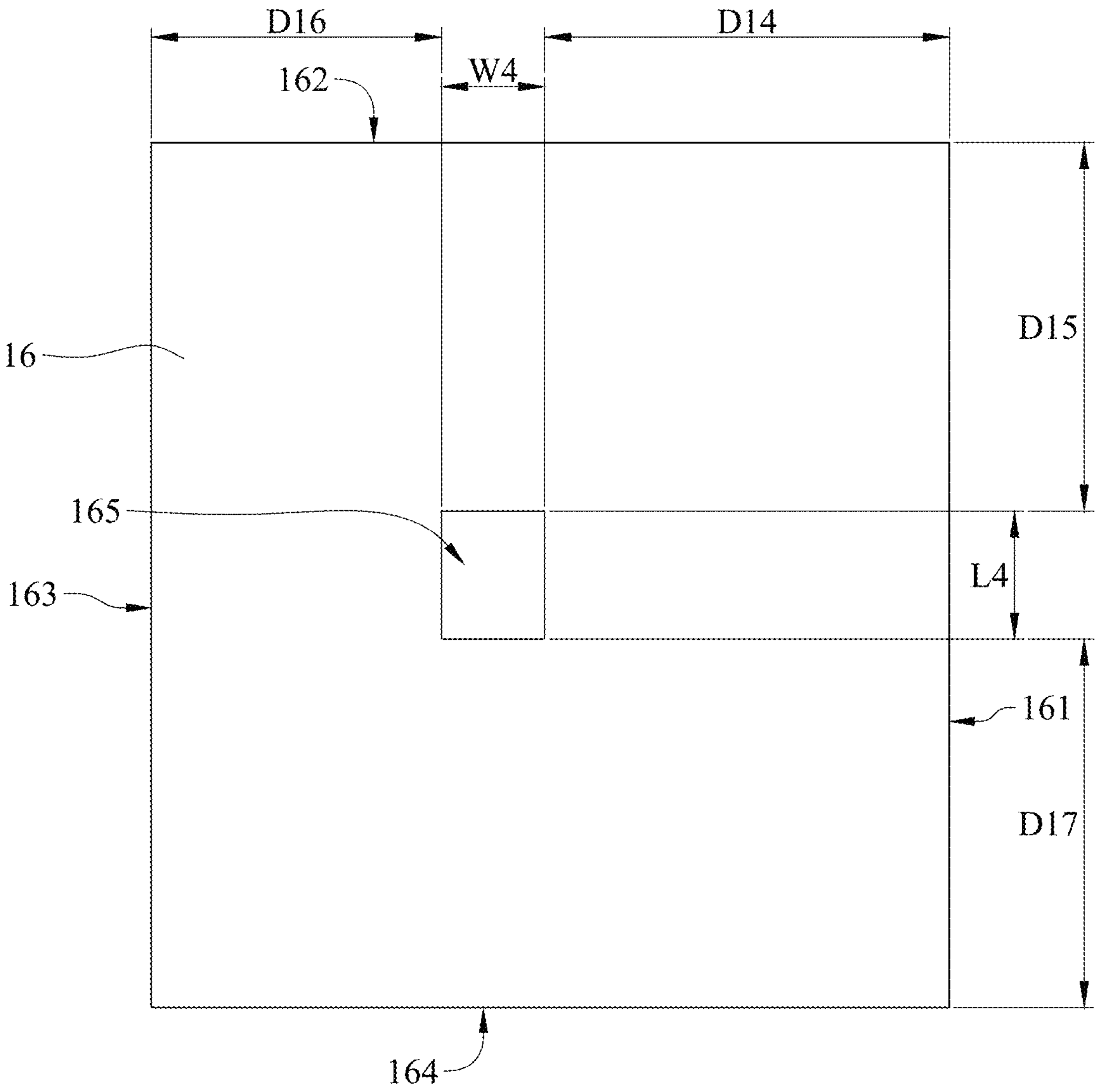
FIG. 6 is a top view of a coupling body of the antenna device in FIG. 1.
Figure 7:
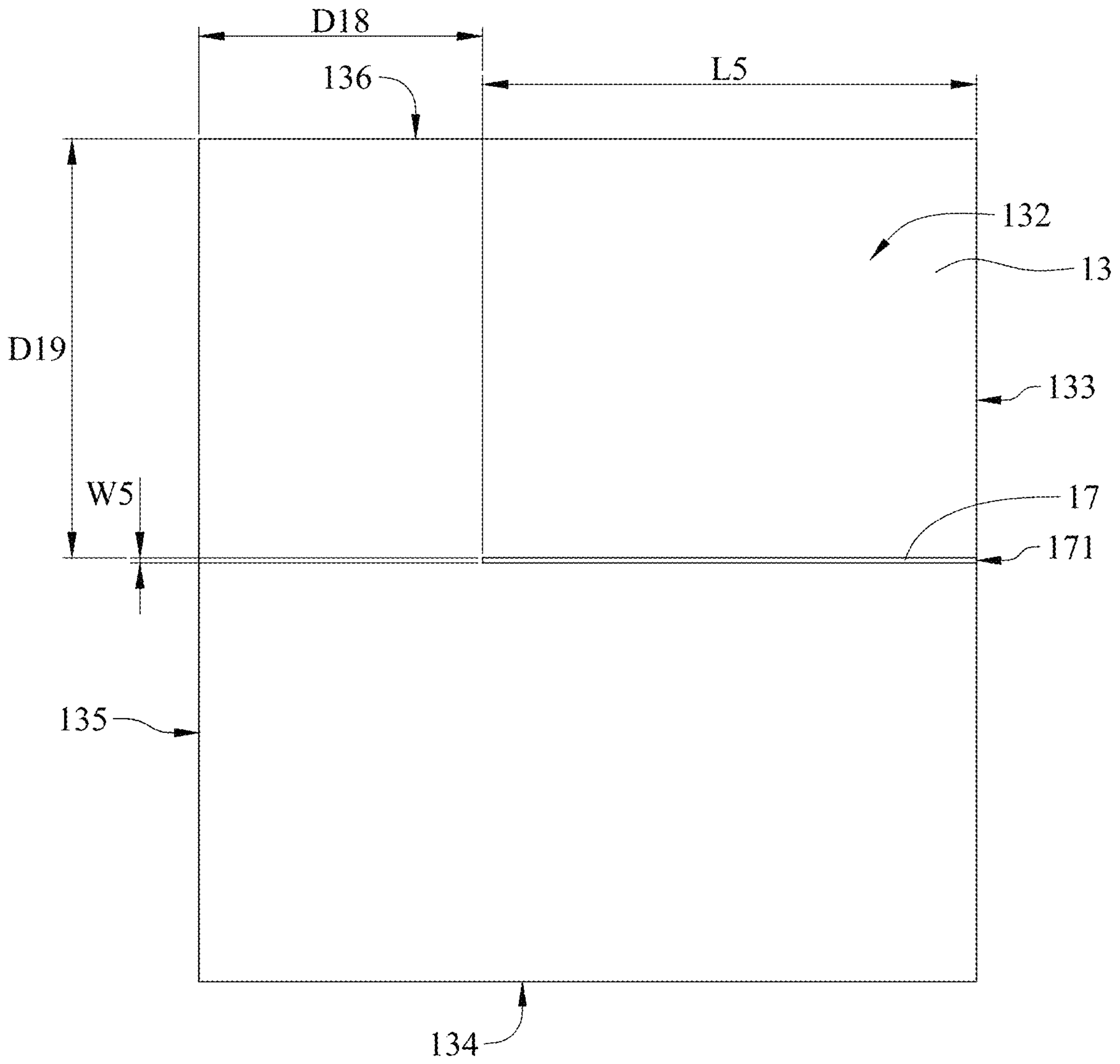
FIG. 7 is a bottom view of a third substrate and a transmission line of the antenna device in FIG. 1.

Please refer to FIG. 1 to FIG. 7, where FIG. 4 is a top view of the first substrate 11 and the low frequency exciting assembly 14 of the antenna device 10 in FIG. 1, FIG. 5 is a top view of the second substrate 12 and the high frequency exciter 15 of the antenna device 10 in FIG. 1, FIG. 6 is a top view of the coupling body 16 of the antenna device 10 in FIG. 1, and FIG. 7 is a bottom view of the third substrate 13 and the transmission line 17 of the antenna device 10 in FIG. 1.

The first substrate 11 has a first top surface 111, a first bottom surface 112, a first side 113, a second side 114, a third side 115 and a fourth side 116. The first top surface 111 and the first bottom surface 112 are located opposite to each other. The first side 113, the second side 114, the third side 115 and the fourth side 116 are connected to each other, and are located between the first top surface 111 and the first bottom surface 112.

The second substrate 12 is stacked on the first substrate 11, and has a second top surface 121, a second bottom surface 122, a fifth side 123, a sixth side 124, a seventh side 125 and an eighth side 126. The second top surface 121 and the second bottom surface 122 are located opposite to each other. The second bottom surface 122 is connected to the first top surface 111. The fifth side 123, the sixth side 124, the seventh side 125 and the eighth side 126 are connected to each other, and are located between the second top surface 121 and the second bottom surface 122.

The third substrate 13 is stacked on the first substrate 11, and has a third top surface 131, a third bottom surface 132, a ninth side 133, a tenth side 134, an eleventh side 135 and a twelfth side 136. The third top surface 131 and the third bottom surface 132 are located opposite to each other. The third top surface 131 is connected to the first bottom surface 112. The ninth side 133, the tenth side 134, the eleventh side 135 and the twelfth side 136 are connected to each other, and are located between the third top surface 131 and the third bottom surface 132.

The low frequency exciting assembly 14 is configured to generate a low frequency mode at, for example, 19.53 gigahertz (GHz), and is disposed on the first top surface 111. The low frequency exciting assembly 14 includes two first low frequency exciters 141, two second low frequency exciters 142 and a third low frequency exciter 143. The first low frequency exciters 141 and the second low frequency exciters 142 are arranged along two parallel lines, respectively. At least a part of the third low frequency exciter 143 is disposed between the first low frequency exciters 141 and the second low frequency exciters 142. That is, the first low frequency exciters 141, the second low frequency exciters 142 and the third low frequency exciter 143 are arranged along a C-shaped line.

The high frequency exciter 15 is configured to generate a high frequency mode at, for example, 24.56 GHz, and is disposed on the second top surface 121. A projection of the high frequency exciter 15 orthogonally projected onto the first substrate 11, for example, does not overlap with the low frequency exciting assembly 14. Specifically, the first low frequency exciters 141, the second low frequency exciters 142 and the third low frequency exciter 143, for example, together surround the projection of the high frequency exciter 15 orthogonally projected onto the first substrate 11. Since the low frequency exciting assembly 14 and the high frequency exciter 15 are disposed on the first substrate 11 and the second substrate 12, respectively, the overall thickness of the first substrate 11, the second substrate 12 and the third substrate 13 can be further reduced.

In this embodiment, the first low frequency exciters 141, the second low frequency exciters 142, the third low frequency exciter 143 and the high frequency exciter 15 are made of, for example, copper foils. In addition, the first low frequency exciters 141, the second low frequency exciters 142, the third low frequency exciter 143 and the high frequency exciter 15 are, for example, rectangular. Furthermore, the first low frequency exciters 141, the second low frequency exciters 142, the third low frequency exciter 143 and the high frequency exciter 15 are, for example, square.

The coupling body 16 is disposed on the third top surface 131, and has a thirteenth side 161, a fourteenth side 162, a fifteenth side 163, a sixteenth side 164 and a slot 165. The thirteenth side 161, the fourteenth side 162, the fifteenth side 163 and the sixteenth side 164 are connected to each other. The slot 165 is spaced apart from the thirteenth side 161, the fourteenth side 162, the fifteenth side 163 and the sixteenth side 164.

In this embodiment, the first side 113, the fifth side 123, the ninth side 133 and the thirteenth side 161 are located at one same side of the antenna device 10. The second side 114, the sixth side 124, the tenth side 134 and the fourteenth side 162 are located at another same side of the antenna device 10. The third side 115, the seventh side 125, the eleventh side 135 and the fifteenth side 163 are located at another same side of the antenna device 10. The fourth side 116, the eighth side 126, the twelfth side 136 and the sixteenth side 164 are located at another same side of the antenna device 10.

The transmission line 17 is disposed on the third bottom surface 132, and has a feeing point 171. The feeing point 171 is located at one of the ninth side 133, the tenth side 134, the eleventh side 135 and the twelfth side 136. For example, the feeing point 171 is located at the ninth side 133. When signals are fed into the antenna device 10 via the feeing point 171, the signals are transmitted to the coupling body 16 via the transmission line 17. Then, the signals are coupled to the low frequency exciting assembly 14 and the high frequency exciter 15 via the coupling body 16. The coupling body 16 and the transmission line 17 are made of, for example, copper foils.

Figure 8:
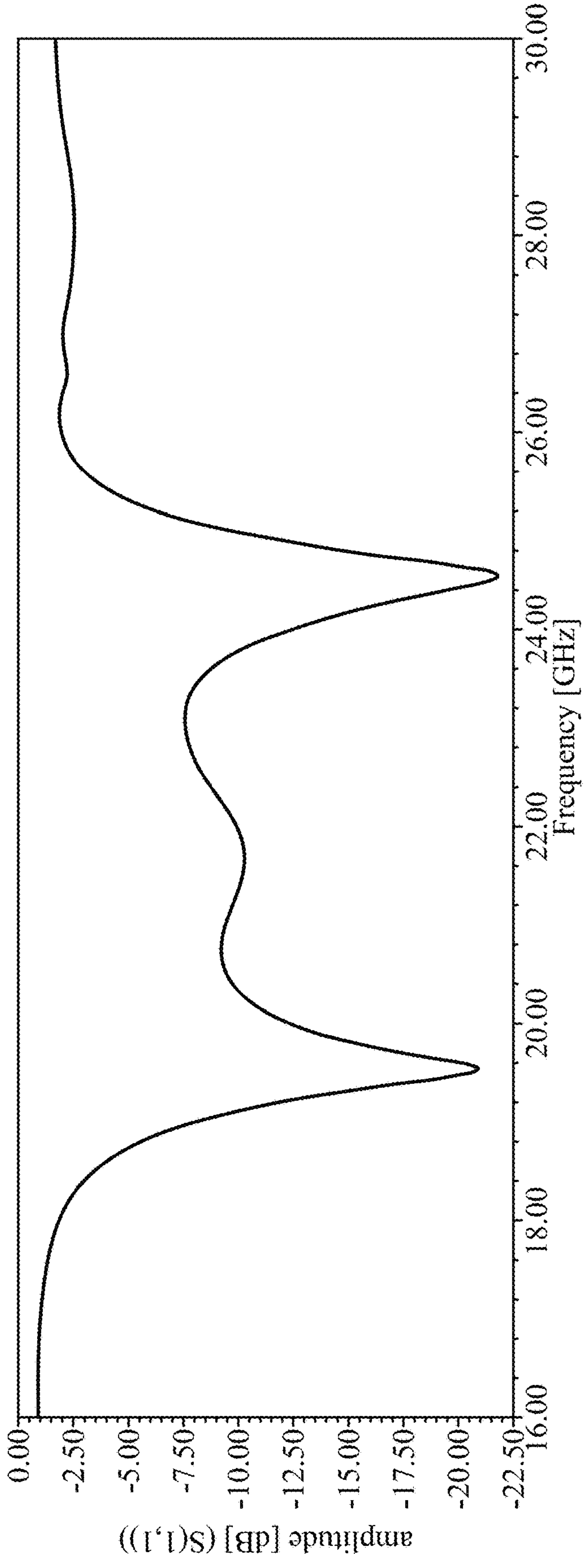
FIG. 8 is a curve chart showing a return loss of the antenna device in FIG. 1.

Please refer to FIG. 1 to FIG. 8, where FIG. 8 is a curve chart showing a return loss of the antenna device 10 in FIG.

1. In this embodiment, in a frequency band of a K-band (e.g. a range from 18.84 GHz to 25.23 GHz) of a millimeter wave, the return losses of the antenna device 10 are low, so that the impedance matching of the antenna device 10 is good. In addition, generally, the higher the gain of the antenna is, the more concentrated the radiation from the antenna becomes, allowing the signal radiated from the antenna to be transmitted farther in a specific direction. In this embodiment, in the aforementioned frequency band, the antenna device 10, for example, has a maximum gain of 7.3 dBi.

In this embodiment, a length of the first substrate 11, a width of the first substrate 11, a length of the second substrate 12, a width of the second substrate 12, a length of the third substrate 13 and a width of the third substrate 13 are, for example, the same. Taking the first substrate 11 for example, a length L1 of the first substrate 11 is, for example, 12.84 millimeters, and a width W1 of the first substrate 11 is, for example, 11.84 millimeters.

In addition, a thickness T2 of the second substrate 12 and a thickness T3 of the third substrate 13 are, for example, the same, and a thickness T1 of the first substrate 11 and a thickness T2 of the second substrate 12 are, for example, different for facilitating the manufacturing process. For example, the thickness T1 of the first substrate 11 is 0.422 millimeters, and the thickness T2 of the second substrate 12 and the thickness T3 of the third substrate 13 are 0.03 millimeters. That is, the overall thickness of the first substrate 11, the second substrate 12 and the third substrate 13 is, for example, 0.482 millimeters merely.

In this embodiment, a size of each of the first low frequency exciters 141, a size of each of the second low frequency exciters 142 and a size of the third low frequency exciter 143 are, for example, the same. Taking one of the first low frequency exciters 141 for example, a length L2 and a width W2 of the first low frequency exciter 141 are, for example, 2.64 millimeters, respectively.

In addition, a distance between the first low frequency exciters 141 and a distance between the second low frequency exciters 142 are, for example, the same. Taking a distance D1 between the first low frequency exciters 141 for example, the distance D1 between the first low frequency exciters 141 is, for example, 0.15 millimeters. A distance between the third low frequency exciter 143 and one of the first low frequency exciters 141 and a distance between the third low frequency exciter 143 and one of the second low frequency exciters 142 are, for example, the same. Taking a distance D2 between the third low frequency exciter 143 and one of the first low frequency exciters 141 for example, the distance D2 between the third low frequency exciter 143 and one of the first low frequency exciters 141 is, for example, 0.115 millimeters.

In this embodiment, a distance D3 between one of the first low frequency exciters 141 and the first side 113 is, for example, 3.705 millimeters. A distance D4 between each of the first low frequency exciters 141 and the second side 114 is, for example, 2.33 millimeters. A distance D5 between another one of the first low frequency exciters 141 and the third side 115 is, for example, 2.705 millimeters. A distance D6 between each of the second low frequency exciters 142 and the fourth side 116 is, for example, 2.33 millimeters. A distance D7 between the third low frequency exciter 143 and the first side 113 is, for example, 8.215 millimeters. A distance D8 between the third low frequency exciter 143 and the third side 115 is, for example, 0.985 millimeters. A distance D9 between the third low frequency exciter 143 and the fourth side 116 is, for example, 5.085 millimeters.

In this embodiment, a length L3 of the high frequency exciter 15 is, for example, 2.6 millimeters. A width W3 of the high frequency exciter 15 is, for example, 2.45 millimeters. In addition, a distance D10 between the high frequency exciter 15 and the fifth side 123 is, for example, 5.295 millimeters. A distance D11 between the high frequency exciter 15 and the sixth side 124 is, for example, 5.12 millimeters. A distance D12 between the high frequency exciter 15 and the seventh side 125 is, for example, 4.095 millimeters. A distance D13 between the high frequency exciter 15 and the eighth side 126 is, for example, 5.12 millimeters.

In this embodiment, a length L4 of the slot 165 is, for example, 1.9 millimeters, and a width W4 of the slot 165 is, for example, 1.53 millimeters. In addition, a distance D14 between the slot 165 and the thirteenth side 161 is, for example, 6.005 millimeters. A distance D15 between the slot 165 and the fourteenth side 162 is, for example, 5.47 millimeters. A distance D16 between the slot 165 and the fifteenth side 163 is, for example, 4.305 millimeters. A distance D17 between the slot 165 and the sixteenth side 164 is, for example, 5.47 millimeters.

In this embodiment, a length L5 of the transmission line 17 is, for example, 7.52 millimeters. A width W5 of the transmission line 17 is, for example, 0.0768 millimeters. In addition, a distance D18 between the transmission line 17 and the eleventh side 135 is, for example, 4.32 millimeters. A distance D19 between the transmission line 17 and the twelfth side 136 is, for example, 6.3816 millimeters.

In this embodiment, the low frequency exciting assembly 14 and the high frequency exciter 15 are disposed on the first substrate 11 and the second substrate 12, respectively, and the low frequency exciting assembly 14 and the high frequency exciter 15 can generate low frequency signals and high frequency signals, respectively. Therefore, the antenna device 10 can generate a wider frequency band to cover the frequency band of the K-band of the millimeter wave, and the return loss of this frequency band can be reduced so as to meet communication requirements of 6G. Accordingly, the communication quality of the antenna device 10 in the frequency band of 6G technology can be improved.

Furthermore, the first low frequency exciters 141 and the second low frequency exciters 142 are arranged along two parallel lines, respectively. At least a part of the third low frequency exciter 143 is disposed between the first low frequency exciters 141 and the second low frequency exciters 142. The projection of the high frequency exciter 15 orthogonally projected onto the first substrate 11 does not overlap with the low frequency exciting assembly 14. Therefore, the frequency band generated by the antenna device 10 can cover the frequency band of the K-band of the millimeter wave via the aforementioned arrangement.

In this embodiment, the antenna device 10 includes the first substrate 11, the second substrate 12 and the third substrate 13, but the invention is not limited thereto. In other embodiments, the antenna device may include the first substrate and the second substrate merely.

In this embodiment, the second substrate 12 and the third substrate 13 are made of the same materials, and the first substrate 11 and the second substrate 12 are made of the different materials, but the invention is not limited thereto. In other embodiments, the first substrate, the second substrate and the third substrate may be made of the same materials.

In this embodiment, the thickness T2 of the second substrate 12 and the thickness T3 of the third substrate 13 are the same, and the thickness T1 of the first substrate 11 and the thickness T2 of the second substrate 12 are different, but the invention is not limited thereto. In other embodiments, the thickness of the first substrate, the thickness of the second substrate and the thickness of the third substrate may be the same.

Other embodiments are described below for illustrative purposes. Note that the following embodiments use the reference numerals and a part of the contents of the above embodiments, the same reference numerals are used to denote the same or similar elements, and the description of the same technical contents is omitted. For the description of the omitted part, reference may be made to the above embodiments, and details are not described in the following embodiments.

Figure 9:
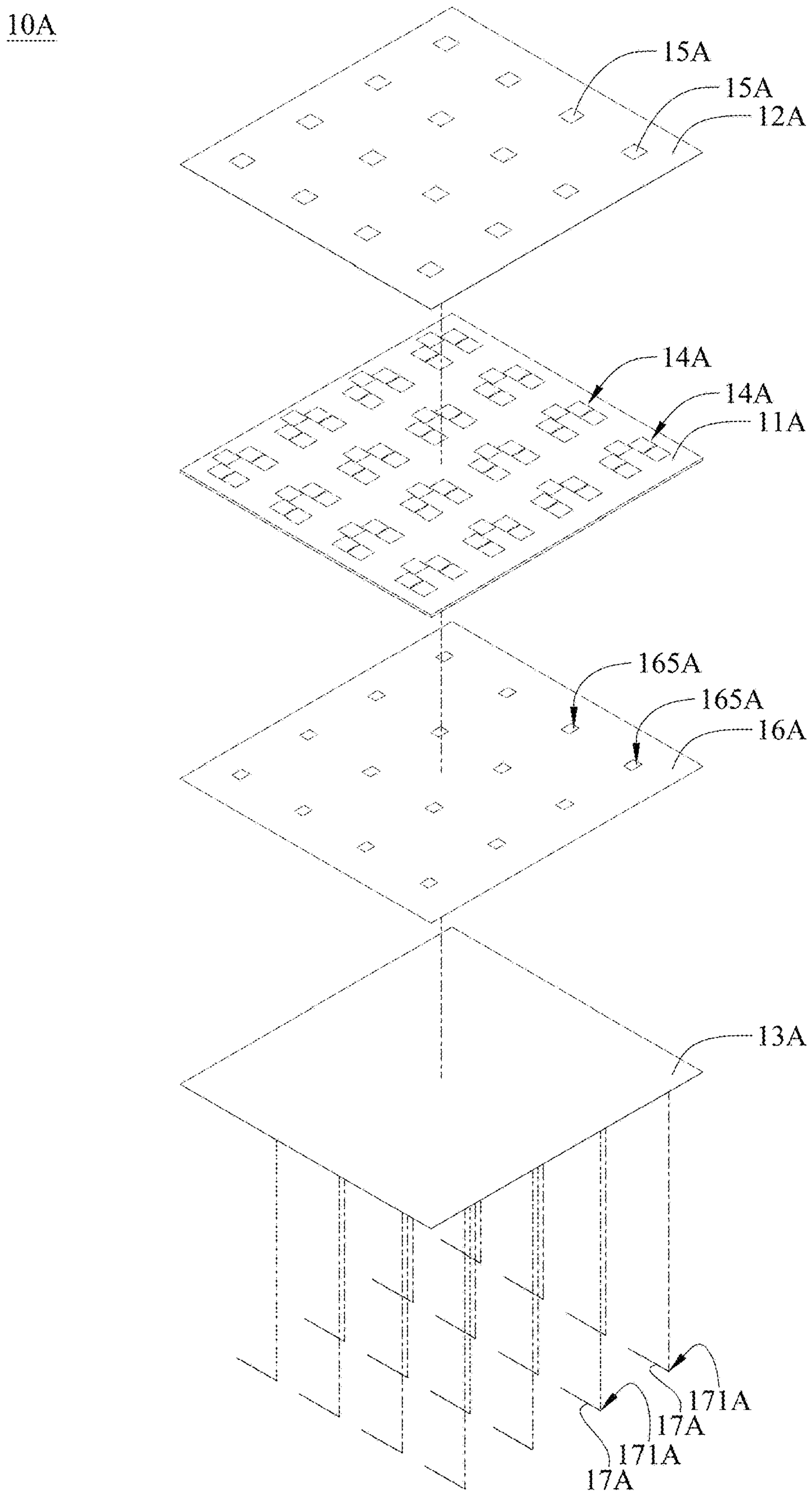
FIG. 9 is an exploded view of an antenna device in accordance with second embodiment of the invention.

Please refer to FIG. 9, which is an exploded view of an antenna device 10A in accordance with second embodiment of the invention. The antenna device 10A of this embodiment is similar to the antenna device 10 of the first embodiment, the main difference between them will be described below, and the same parts between them can be referred to the aforementioned paragraphs with the reference to FIG. 1 to FIG. 8 and will not be repeatedly introduced hereinafter.

In this embodiment, the antenna device 10A includes a plurality of low frequency exciting assemblies 14A, a plurality of high frequency exciters 15A and a plurality of transmission lines 17A, and the coupling body 16A has a plurality of slots 165A. The low frequency exciting assemblies 14A, the high frequency exciters 15A, the slots 165A and the transmission lines 17A are arranged in an array, and correspond to each other. A least a part of the feeding points 171A of the transmission lines 17A are located at one of four sides of the third substrate 13A.

Figure 10:
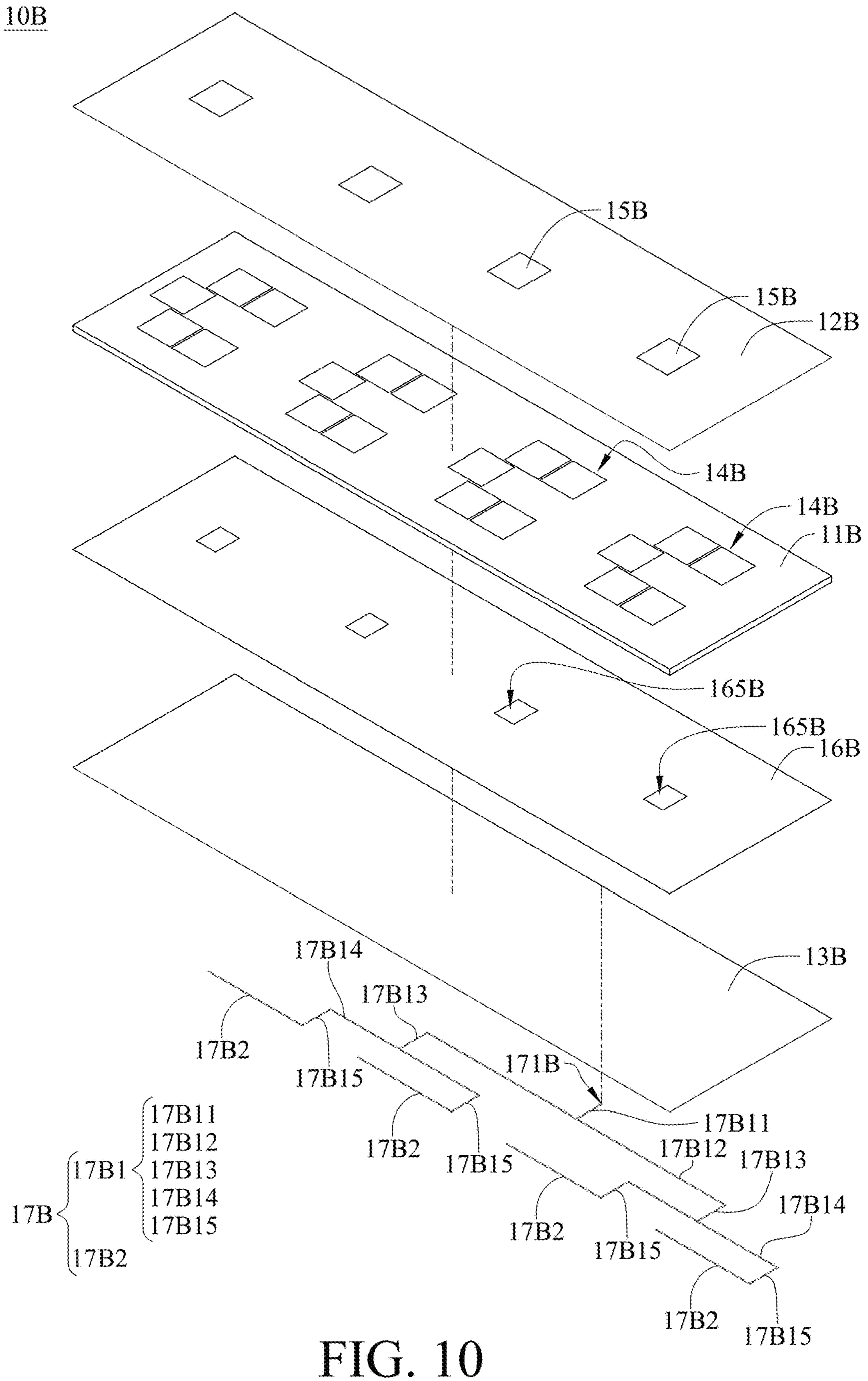
FIG. 10 is an exploded view of an antenna device in accordance with third embodiment of the invention.

Please refer to FIG. 10, which is an exploded view of an antenna device 10B in accordance with third embodiment of the invention. The antenna device 10B of this embodiment is similar to the antenna device 10 of the first embodiment, the main difference between them will be described below, and the same parts between them can be referred to the aforementioned paragraphs with the reference to FIG. 1 to FIG. 8 and will not be repeatedly introduced hereinafter.

In this embodiment, the antenna device 10B includes a plurality of low frequency exciting assemblies 14B and a plurality of high frequency exciters 15B, and the coupling body 16B has a plurality of slots 165B. The low frequency exciting assemblies 14B, the high frequency exciters 15B and the slots 165B are arranged side by side, and correspond to each other. In detail, in the low frequency exciting assemblies 14B, the first low frequency exciters 141 and the second low frequency exciters 142 shown in FIG. 1 to FIG. 7 are arranged along two parallel lines, respectively. That is, in each of the low frequency exciting assemblies 14B, the first low frequency exciters 141 shown in FIG. 1 to FIG. 7, the second low frequency exciters 142 and the third low frequency exciter 143 are arranged along a C-shaped line. Openings of some of the C-shaped arrangements correspond to the low frequency exciting assemblies 14B located adjacent thereto.

In this embodiment, the transmission line 17B includes a feeding portion 17B1 and a plurality of connecting portions 17B2. The feeding portion 17B1 has a feeding point 171B. The feeding point 171B is configured for signals to be fed into the antenna device 10. The feeding portion 17B1 has four branch ends located far away from the feeding point 171B. The connecting portions 17B2 are connected to the branch ends, respectively, and extend along a same direction. The connecting portions 17B2 are configured to transmit the signals to the coupling body 16B.

In detail, the feeding portion 17B1 includes a first section 17B11, a second section 17B12, two third sections 17B13, two fourth sections 17B14 and four fifth sections 17B15, and the plurality of connecting portions 17B2 includes four connecting portions 17B2. An end of the first section 17B11 has the feeding point 171B, and another end of the first section 17B11 is connected to a central part of the second section 17B12. An end of the second section 17B12 is connected to an end of one of the third sections 17B13, and another end of the second section 17B12 is connected to an end of another one of the third sections 17B13. Another end of one of the third sections 17B13 is connected to a central part of one of the fourth sections 17B14, and another end of another one of the third sections 17B13 is connected to a central part of another one of the fourth sections 17B14. Two opposite ends of one of the fourth sections 17B 14 are connected to ends of two of the fifth sections 17B15, respectively, and two opposite ends of another one of the fourth sections 17B14 are connected to ends of other two of the fifth sections 17B15, respectively. Other ends of the fifth sections 17B15 are the aforementioned four branch ends. The connecting portions 17B2 are connected to the fifth sections 17B15, respectively.

Figure 11:
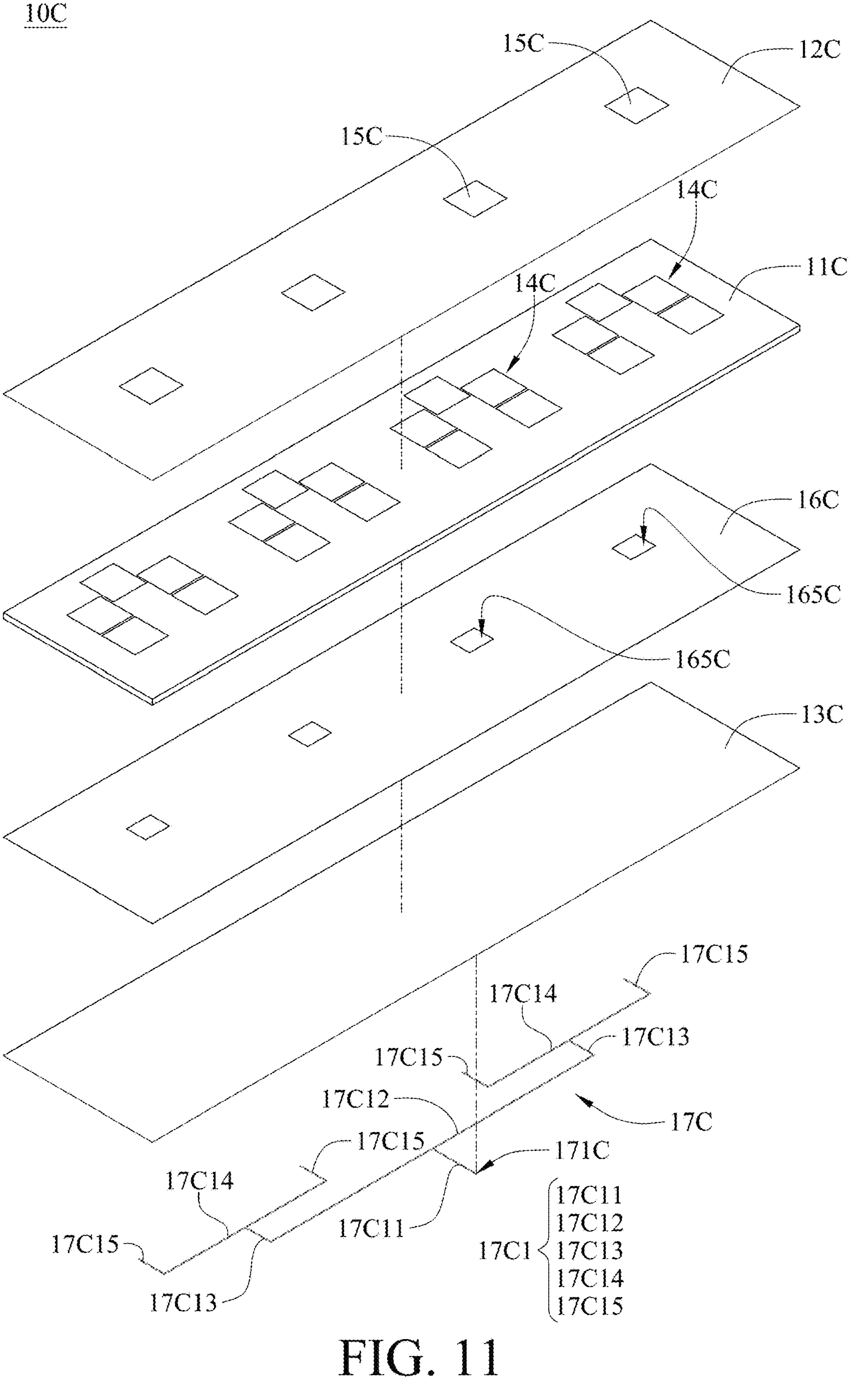
FIG. 11 is an exploded view of an antenna device in accordance with fourth embodiment of the invention.

Please refer to FIG. 11, which is an exploded view of an antenna device 10C in accordance with fourth embodiment of the invention. The antenna device 10C of this embodiment is similar to the antenna device 10 of the first embodiment, the main difference between them will be described below, and the same parts between them can be referred to the aforementioned paragraphs with the reference to FIG. 1 to FIG. 8 and will not be repeatedly introduced hereinafter.

In this embodiment, the antenna device 10C includes a plurality of low frequency exciting assemblies 14C and a plurality of high frequency exciters 15C, and the coupling body 16C has a plurality of slots 165C. The low frequency exciting assemblies 14C, the high frequency exciters 15C and the slots 165C are arranged side by side, and correspond to each other. In detail, in any two of the adjacent low frequency exciting assemblies 14C, the first low frequency exciters 141 shown in FIG. 1 to FIG. 7 are arranged along two parallel lines, respectively. That is, the second low frequency exciters 142 shown in FIG. 1 to FIG. 7 of one of the low frequency exciting assemblies 14C are adjacent to the first low frequency exciters 141 shown in FIG. 1 to FIG. 7 of another one of the low frequency exciting assemblies 14C.

In this embodiment, the transmission line 17C includes a feeding portion 17C1. The feeding portion 17C1 has a feeding point 171C. The feeding portion 17C1 has four branch ends located far away from the feeding point 171C. The feeding portion 17C1 is configured to transmit signals to the coupling body 16B from the branch ends after the signals are fed into the antenna device 10 from the feeding point 171C.

In detail, the feeding portion 17C1 includes a first section 17C11, a second section 17C12, two third sections 17C13, two fourth sections 17C14 and four fifth sections 17C15. An end of the first section 17C11 has the feeding point 171C, and another end of the first section 17C11 is connected to a central part of the second section 17C12. An end of the second section 17C12 is connected to an end of one of the third sections 17C13, and another end of the second section 17C12 is connected to an end of another one of the third sections 17C13. Another end of one of the third sections 17C13 is connected to a central part of one of the fourth sections 17C14, and another end of another one of the third sections 17C13 is connected to a central part of another one of the fourth sections 17C14. Two opposite ends of one of the fourth sections 17C14 are connected to ends of two of the fifth sections 17C15, respectively, and two opposite ends of another one of the fourth sections 17C14 are connected to ends of other two of the fifth sections 17C15, respectively. Other ends of the fifth sections 17C15 are the aforementioned four branch ends.

In the above embodiments, the frequency band of the K-band of the millimeter wave can be applied to various fields such as the high resolution audio and video streaming, the frequency bands for virtual reality (VR) and augmented reality (AR), autonomous vehicles, the industrial automation, the remote medical surgery, the Internet of Things (IoT), the satellite communication and the wireless backbone network.

According to the antenna device disclosed by the above embodiments, the low frequency exciting assembly and the high frequency exciter are disposed on the first substrate and the second substrate, respectively, and the low frequency exciting assembly and the high frequency exciter can generate low frequency signals and high frequency signals, respectively. Therefore, the antenna device can generate a wider frequency band to cover the frequency band of the K-band of the millimeter wave, and the return loss of this frequency band can be reduced so as to meet communication requirements of 6G. Accordingly, the communication quality of the antenna device in the frequency band of 6G technology can be improved.

Furthermore, the first low frequency exciters and the second low frequency exciters are arranged along two parallel lines, respectively. At least a part of the third low frequency exciter is disposed between the first low frequency exciters and the second low frequency exciters. The projection of the high frequency exciter orthogonally projected onto the first substrate does not overlap with the low frequency exciting assembly. Therefore, the frequency band generated by the antenna device can cover the frequency band of the K-band of the millimeter wave via the aforementioned arrangement.

It will be apparent to those skilled in the art that various modifications and variations can be made to the invention. It is intended that the specification and examples be considered as exemplary embodiments only, with the scope of the invention being indicated by the following claims.

What is claimed is:

1. An antenna device, comprising:

a first substrate, having a first top surface and a first bottom surface located opposite to each other;

a second substrate, stacked on the first substrate and having a second top surface and a second bottom surface located opposite to each other, wherein the second bottom surface is connected to the first top surface;

a plurality of low frequency exciting assemblies, disposed on the first top surface, wherein each of the plurality of least one low frequency exciting assemblies comprises two first low frequency exciters, two second low frequency exciters and a third low frequency exciter, the two first low frequency exciters and the two second low frequency exciters are arranged along two parallel lines, respectively, and at least a part of the third low frequency exciter is disposed between the two first low frequency exciters and the two second low frequency exciters;

a plurality of high frequency exciters, disposed on the second top surface, wherein a projection of the plurality of high frequency exciters orthogonally projected onto the first substrate does not overlap with the plurality of low frequency exciting assemblies; and a third substrate, wherein the third substrate is stacked on the first substrate, the third substrate has a third top surface and a third bottom surface located opposite to each other, and the third top surface is connected to the first bottom surface;

a coupling body, disposed on the third top surface, wherein the coupling body has four sides and a plurality of slots, and the plurality of slots are spaced apart from the four sides; and a plurality of transmission lines, disposed on the third bottom surface, wherein each of the plurality of transmission lines has a feeding point;

wherein the plurality of low frequency exciting assemblies, the plurality of high frequency exciters, the plurality of slots and the plurality of transmission lines are arranged in an array.

2. The antenna device according to claim 1, wherein the two first low frequency exciters, the two second low frequency exciters, the third low frequency exciter and the plurality of high frequency exciters are rectangular.

3. An antenna device, comprising:

a first substrate, having a first top surface and a first bottom surface located opposite to each other;

a second substrate, stacked on the first substrate and having a second top surface and a second bottom surface located opposite to each other, wherein the second bottom surface is connected to the first top surface;

a plurality of low frequency exciting assemblies, disposed on the first top surface, wherein each of the plurality of least one low frequency exciting assemblies comprises two first low frequency exciters, two second low frequency exciters and a third low frequency exciter, the two first low frequency exciters and the two second low frequency exciters are arranged along two parallel lines, respectively, and at least a part of the third low frequency exciter is disposed between the two first low frequency exciters and the two second low frequency exciters;

a plurality of high frequency exciters, disposed on the second top surface, wherein a projection of the plurality of high frequency exciters orthogonally projected onto the first substrate does not overlap with the plurality of low frequency exciting assemblies; and a third substrate, wherein the third substrate is stacked on the first substrate, the third substrate has a third top surface and a third bottom surface located opposite to each other, and the third top surface is connected to the first bottom surface;

a coupling body, disposed on the third top surface, wherein the coupling body has four sides and a plurality of slots, and the plurality of slots are spaced apart from the four sides; and at least one transmission line, disposed on the third bottom surface and having a feeding point;

wherein the plurality of low frequency exciting assemblies, the plurality of high frequency exciters and the plurality of slots are arranged side by side.

4. The antenna device according to claim 3, wherein the first low frequency exciters and second low frequency exciters of the plurality of low frequency exciting assemblies are arranged along two parallel lines, respectively.

5. The antenna device according to claim 4, wherein the at least one transmission line comprises a feeding portion and a plurality of connecting portions, the feeding portion has the feeding point, the feeding portion has a plurality of branch ends located far away from the feeding point, the plurality of connecting portions are connected to the plurality of branch ends, respectively, and the plurality of connecting portions extend along a same direction.

6. The antenna device according to claim 3, wherein the first low frequency exciters of any two of the adjacent low frequency exciting assemblies are arranged along two parallel lines, respectively, and the second low frequency exciters of any two of the adjacent low frequency exciting assemblies are arranged along two parallel lines, respectively.

7. The antenna device according to claim 6, wherein the at least one transmission line comprises a feeding portion, the feeding portion has the feeding point, the feeding portion has a plurality of branch ends located far away from the feeding point.

* * * * *